(12) United States Patent
De' Longhi

(10) Patent No.: US 8,618,447 B2
(45) Date of Patent: Dec. 31, 2013

(54) DEEP FRYER AND METHOD FOR COOKING FOOD PRODUCTS

(76) Inventor: Giuseppe De' Longhi, Treviso (IT)

( * ) Notice: Subject to any disclaimer, the term of this patent is extended or adjusted under 35 U.S.C. 154(b) by 218 days.

(21) Appl. No.: 13/121,078

(22) PCT Filed: Aug. 3, 2009

(86) PCT No.: PCT/EP2009/005598
§ 371 (c)(1),
(2), (4) Date: Mar. 25, 2011

(87) PCT Pub. No.: WO2010/034374
PCT Pub. Date: Apr. 1, 2010

(65) Prior Publication Data
US 2011/0256285 A1 Oct. 20, 2011

(30) Foreign Application Priority Data
Sep. 29, 2008 (IT) .............................. MI2008A1721

(51) Int. Cl.
*A47J 37/12* (2006.01)
*A23L 1/01* (2006.01)
(52) U.S. Cl.
USPC ............. 219/430; 219/432; 219/433; 99/348; 99/357; 99/409; 126/376.1; 126/377.1
(58) Field of Classification Search
None
See application file for complete search history.

(56) References Cited

U.S. PATENT DOCUMENTS

| 4,901,633 | A | * | 2/1990 | De Longhi | 99/409 |
| 5,027,697 | A | | 7/1991 | De Longhi | |
| 5,993,872 | A | * | 11/1999 | Rolle et al. | 99/409 |
| 6,629,491 | B1 | * | 10/2003 | Chan | 99/348 |
| 6,777,010 | B1 | | 8/2004 | Rolle et al. | |
| 6,834,577 | B2 | * | 12/2004 | Xu | 99/409 |
| 7,411,159 | B2 | * | 8/2008 | Oosterling | 219/400 |
| 7,901,721 | B2 | * | 3/2011 | Oosterling | 426/466 |
| 2004/0194635 | A1 | * | 10/2004 | Xu | 99/330 |
| 2005/0223906 | A1 | | 10/2005 | Xu et al. | |
| 2009/0220658 | A1 | * | 9/2009 | Al-Asaad | 426/417 |
| 2011/0120319 | A1 | * | 5/2011 | Chang | 99/409 |
| 2012/0012011 | A1 | * | 1/2012 | Millikin et al. | 99/410 |

FOREIGN PATENT DOCUMENTS

| WO | 9202166 A | 2/1992 |
| WO | 2004095996 A | 11/2004 |
| WO | 2006000700 A | 1/2006 |

OTHER PUBLICATIONS

International Search Report of the International Searching Authority dated Sep. 15, 2009.
Written Opinion of the International Searching Authority dated Sep. 15, 2009.

* cited by examiner

*Primary Examiner* — Joseph M Pelham
(74) *Attorney, Agent, or Firm* — Amster, Rothstein & Ebenstein LLP

(57) ABSTRACT

The fryer (1) for cooking a food product, comprises a main body (2) for housing a tilted container (3) adapted to receive the cooking oil, a tilted basket for containing the food product, positioned in an extractable manner in the container, first (30, 31) and second heating means (49), a selector for selecting a first cooking mode in a first volume of oil with the first heating means or a second cooking mode in a second volume of oil greater than the first volume of oil with the second heating means, and rotation means (17) adapted to operate in rotation the basket (11) or at least a mixing paddle (13) present or positionable inside the basket.

19 Claims, 5 Drawing Sheets

DEEP FRYER AND METHOD FOR COOKING FOOD PRODUCTS

The present invention relates to a deep fryer and to a method for cooking food products.

There are currently known different types of deep fryers for cooking food products.

A first type for cooking in oil comprises a container with horizontal or tilted axis containing a rotating basket. In this case during cooking the food product remains permanently and completely immersed in a bath of oil heated by an electrical resistance placed behind the bottom of the container.

A different type has also been proposed for air cooking in which the food product is placed in a container having a horizontal axis with a thin film of oil. A mixing paddle rotates in the container, stirring the food product to impregnate it with oil during cooking performed by means of a forced circulation of hot air which passes through the container.

The first type of fryer has the drawback of cooking in an excess bath of oil which, besides causing a waste of oil used with respect to that effectively required, generally alters the fragrance and organoleptic properties required of the final product.

The second type of fryer allows a considerable saving of oil and more healthy cooking but often has limited efficiency and moreover is unable to achieve the organoleptic properties and fragrances required.

The technical aim set by the present invention is, therefore, to produce a fryer and a cooking method which allow the prior art technical drawbacks mentioned to be overcome.

Within this technical aim an object of the invention is to produce a fryer and a cooking method which allow the food product to be given the required organoleptic properties with minimum oil consumption.

Another object of the invention is to produce a fryer and a cooking method which are extremely versatile, efficient and highly productive.

A further object of the invention is to produce a fryer which is sturdy, compact, structurally and functionally simple but reliable.

The technical aim, and these and other objects according to the present invention are achieved by producing a fryer and a cooking method in conformity with the independent claims appended below.

Moreover, further features of the present invention are defined in the subsequent claims.

Further features and advantages of the invention will be more apparent from the description of a preferred but not exclusive embodiment of the fryer according to the invention, shown by way of non limiting example in the accompanying drawings, wherein.

Figure 1:
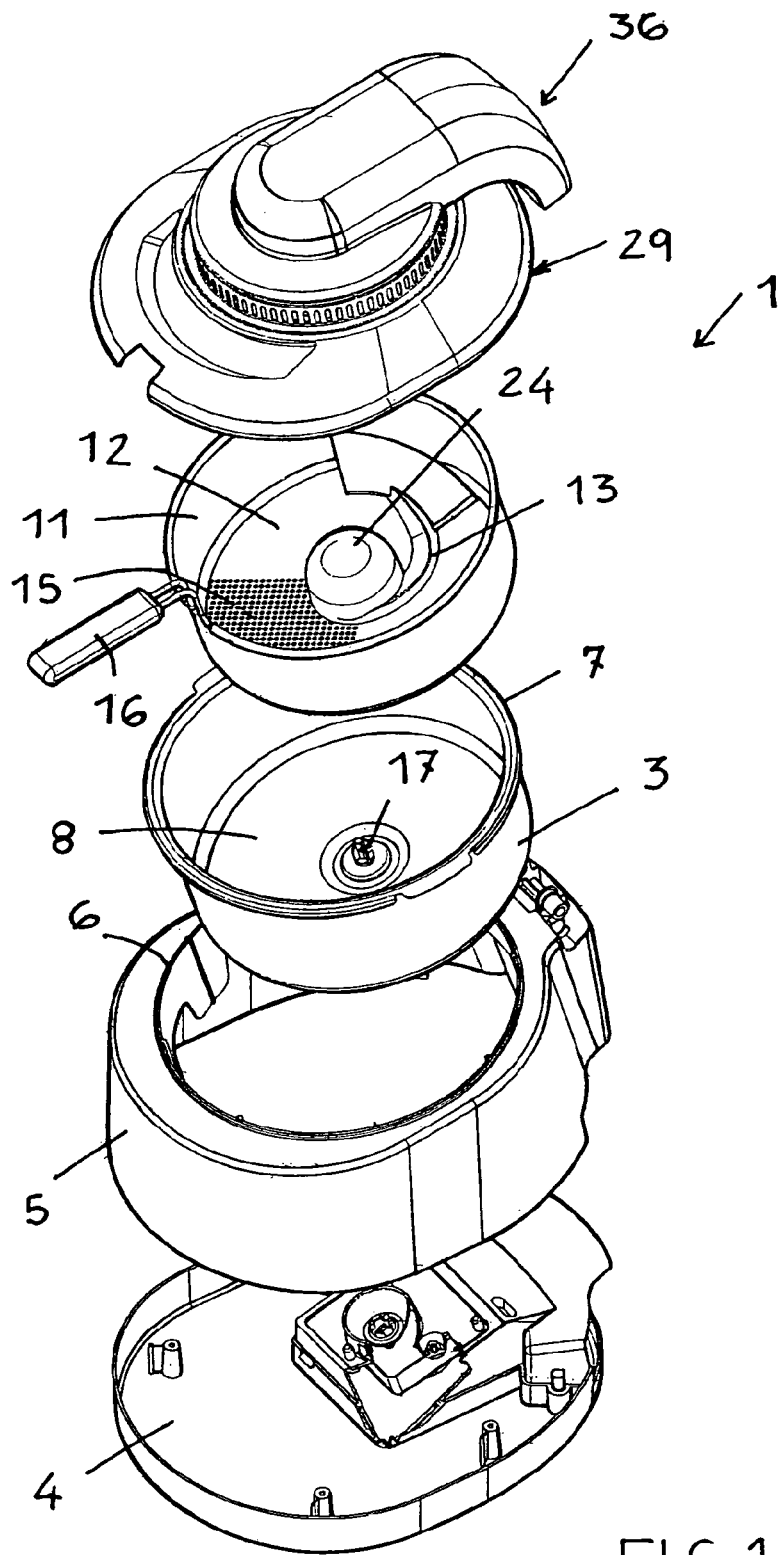
FIG. 1 shows an exploded perspective view of a fryer in conformity with the invention, with the cover assembled.

With reference to the aforesaid figures, there is shown a fryer indicated as a whole with the reference number 1.

The fryer 1 comprises a main body 2 for housing a tilted container 3 adapted to receive the cooking oil 9.

The container 3 is preferably of the type extractable from the main body 2.

A tilted basket 11 for containing the food product is positioned in an extractable and preferably also removable manner in the container 3.

The fryer 1 advantageously comprises first and second heating means, a selector (not shown) for selecting a first cooking mode in a first volume of oil with the first heating means or a second cooking mode in a second volume of oil greater than the first volume of oil with the second heating means, and rotation means adapted to operate in rotation the basket 11 or at least a mixing paddle 13 present or positionable inside the basket 11.

The first heating means are with forced circulation of hot air inside the container 3, and are preferably integrated in a cover 29 of the container 3 hinged directly or indirectly to the body 2.

The first heating means comprise a radial fan 30 circumscribed by at least a first electrical resistance 31, while the second heating means comprise at least a second electrical resistance 49 associated to the container 3, in particular to the bottom 8 of the container 3.

The first electrical resistance 31 is preferably of the halogen type also to improve the visibility of the food during cooking through a special opening made of transparent material positioned for example on the cover 29.

The rotation means comprise a driving pin 17 for rotation of the paddle 13 or of the basket 11.

The pin 17 is arranged along an axis 14 which extends through a central hole 18 of the bottom 8 of the container 3 and through a central hole 19 of the bottom 12 of the basket 11.

A first end of the driving pin 17 is positioned inside the basket 11 while a second end of the driving pin 17 is positioned outside the container 3 and in particular under the bottom 8 of the container 3 where it is connected to the axis of a motor 20 to drive it in rotation.

A bushing 55 ensures centring of the pin 17 in the hole 18 and, through special gaskets 56, also oil seal to prevent contamination of the motor 20.

The motor 20 has a joint 22 to fix it to the central hole 18 of the bottom 8 of the container 3 from which it is separated by a plate-like shield 23.

The container 3 is supported by a tilted shelf 21 which extends from the base 4 of the body 2.

The base 5 bears a shell 5 superiorly provided with a circular opening 6 for insertion therein of the container 3, which in turn has a external perimeter flange 7 to rest on the edge of the opening 6.

The bottom 8 of the container 3 is tilted with respect to the supporting surface of the fryer 1, in a manner such as to obtain a suitable level of oil 9, though in a small amount, in a space 10 corresponding to an angle small with respect to the container 3.

In particular, the container 3 and the basket 11 are cylindrical and coaxial with axis coincident with the axis 14 tilted with respect to the supporting surface of the fryer 1.

The basket 11 has a handle 16 and is preferably removable to be replaced depending on which between the first or second operating mode is selected.

For the second operating mode (FIG. 4) the basket 11 used is preferably the net-like type, while for the first operating mode (FIG. 3) the basket 11 used preferably has a tilted bottom 12 with calibrated holes 15 in the portion thereof adapted to occupy the space 10 to allow loading and unloading oil from inside thereof.

Moreover, while for the second operating mode the basket 11 is preferably associated to the rotation means, for the first operating mode the mixing paddle 13 is preferably associated to the rotation means, adapted to cyclically introduce and remove the food product from the space 10 in such a manner as to perform a combined cooking of the food product by means of the first volume of oil heated by the first heating means when the food product is immersed into the first volume of oil and by means of hot air generated by the first heating means when the food product is not dipped in the first volume of oil.

The paddle 13 in particular has a central dome 24 having its perimeter edge in contact with the basket 11 along a closed line 25 circumscribing the central hole 19 of the basket 11.

To ensure transmission of movement to the blade 13 the dome 24 has on the inner side thereof a central sleeve 26 for removable coupling of the first end of the driving pin 17.

The seal of the coupling between the sleeve 26 and the driving pin 17 is ensured by a gasket 27 interposed between the parts.

To ensure rotational connection of the paddle 13 to the basket 11 the dome 24 presents, on the inner side thereof all around the sleeve 26, elastically yielding members 28 for engaging onto the central hole 19 of the basket 11.

More precisely, the members 28 are teeth coupled under the raised edge of the hole 19.

Returning now to the first heating means, the fan 30 and the resistance 31 are accommodated in a box-shaped body positioned in a hole 32 of the cover 29.

The box-shaped body containing the fan 30 and the resistance 31 comprises a grid bottom wall 33 for axial suctioning of the air from the container 3, a grid side wall 34 for radial air delivery into the container 3, and a top wall 35 for shielding the resistance 31.

The box-shaped body containing the fan 30 and the first resistance 31 is all in all cylindrical in shape.

A special box-shaped support 36 formed by a lower half-part 37 and an upper half-part 38 holds therein a motor 39 for operating the fan 30.

The assembly made by the cover 29 and by the first heating means integrated therein is fixed to the lower half-part 37 of the support.

A grid or other equivalent element 40 is provided between the shield element 35 and the lower half-part 37 of the box-shaped support 36, delimiting a chamber in communication on one side with the external atmospheric environment and on the other side with the motor 39 to create a flow of air for cooling it.

A second cooling fan 104 is also present in this communication chamber.

Advantageously the fryer 1 also has a mechanical decelerator to decelerate closing of the cover 29.

The mechanical decelerator comprises a first toothed arch 41 of a first profile 42 integral with the box-shaped support 36 and interlocking with a second toothed arch 43 of a second profile 44 pivoted to the body 2.

The first arch 41 is rotatable about a axis 45 of the box-shaped support 36 pivoted to the body 2 (also forming the axis of rotation of the cover 29 with respect to the body 2), while the second arch 43 is rotatable about an axis 46, parallel to the axis 45, with which the second profile 44 is pivoted to the body 2.

The second profile 44 has a driving cam 47 of a first end of a spring 48, a second end of which is fixed to the body 2.

In substance, rotation of the cover 29 is transmitted by means of engagement between the arches 41 and 43 to the cam 47, which in turn rotates to move the first end of the spring 48 with respect to the second end thereof which is fixed, generating an axial deformation force that partly opposes the weight force of the assembly formed by the cover 29 and by the heating means integrated therein.

Figure 2:
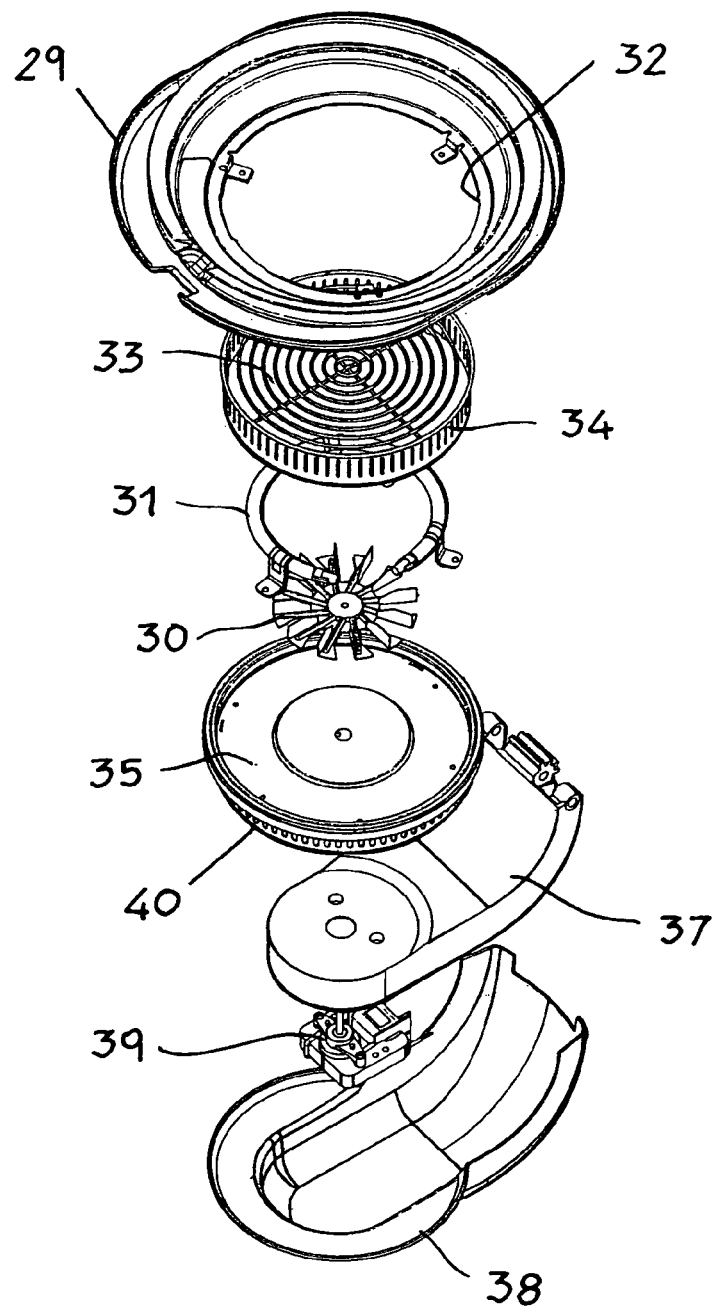
FIG. 2 shows an exploded view of the cover of FIG. 1.
Figure 5:
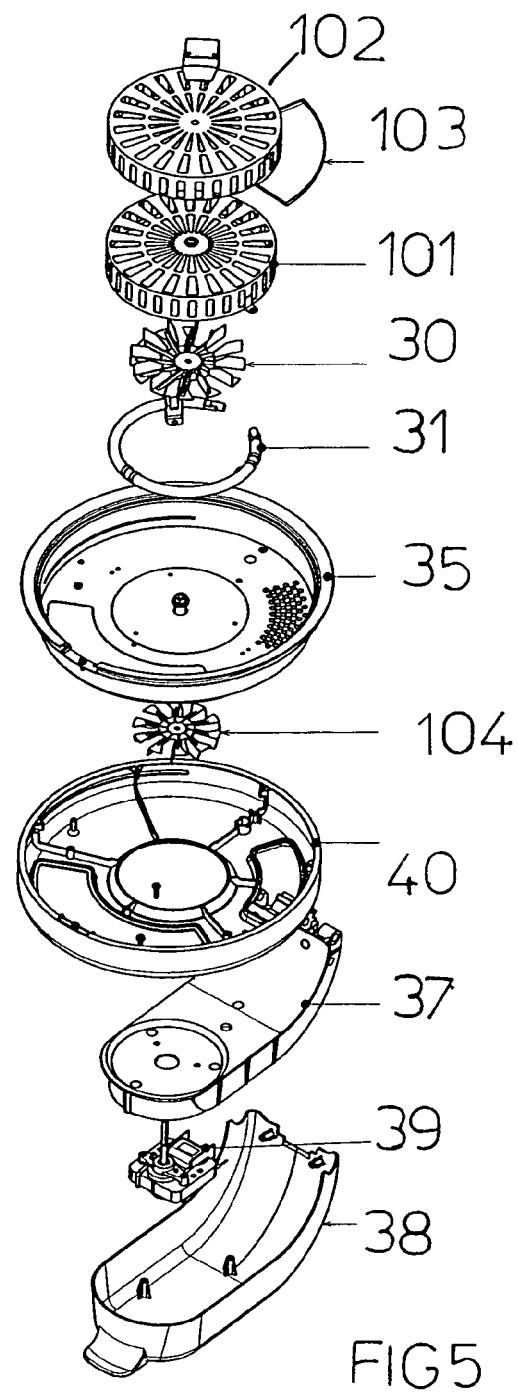
FIG. 5 shows an exploded view of a variant of the cover for the fryer of FIG. 1.

The top wall of the box-shaped body containing the fan 30 and the resistance 31 can be made up of a single element (FIG. 2) or preferably, as shown in FIG. 5, of a first and a second shutter element mutually moveable (for example the first element 101 is fixed and the second element 102 is placed over the first fixed element 101 to which it is pivoted centrally and is moveable by means of a handle 103) between and first closed configuration which insulates the container from the atmospheric environment outside the fryer and a second configuration connecting the container with the atmospheric environment outside the fryer.

When cooking with a small amount of oil according to the first operating mode of the fryer, the top wall of the box-shaped body containing the fan 30 and the resistance 31 is in the closed configuration for thermally insulating the container from the external atmospheric environment, while when cooking with more oil according to the second operating mode of the fryer, the top wall of the box-shaped body containing the fan 30 and the resistance 31 is in the open configuration which allows the steam produced to escape and prevents the accumulation of residues in the container which could compromise the quality of cooking and correct operation of the fryer.

To fry the food product 50 the operating mode must be selected through the selector (not shown).

Figure 3:
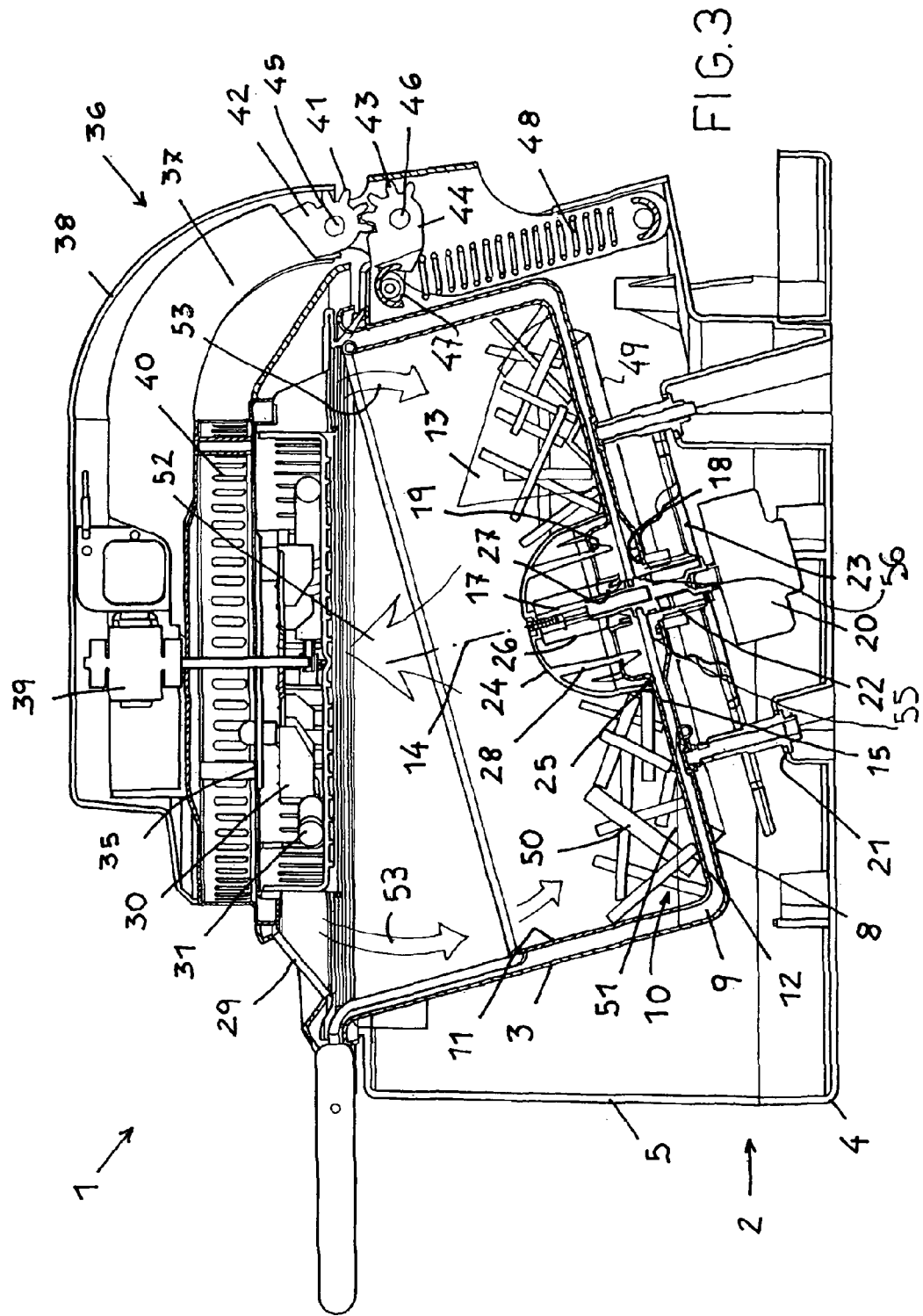
FIG. 3 shows an assembled view of the fryer of FIG. 1 in a cross section along a diametral plane thereof.
Figure 4:
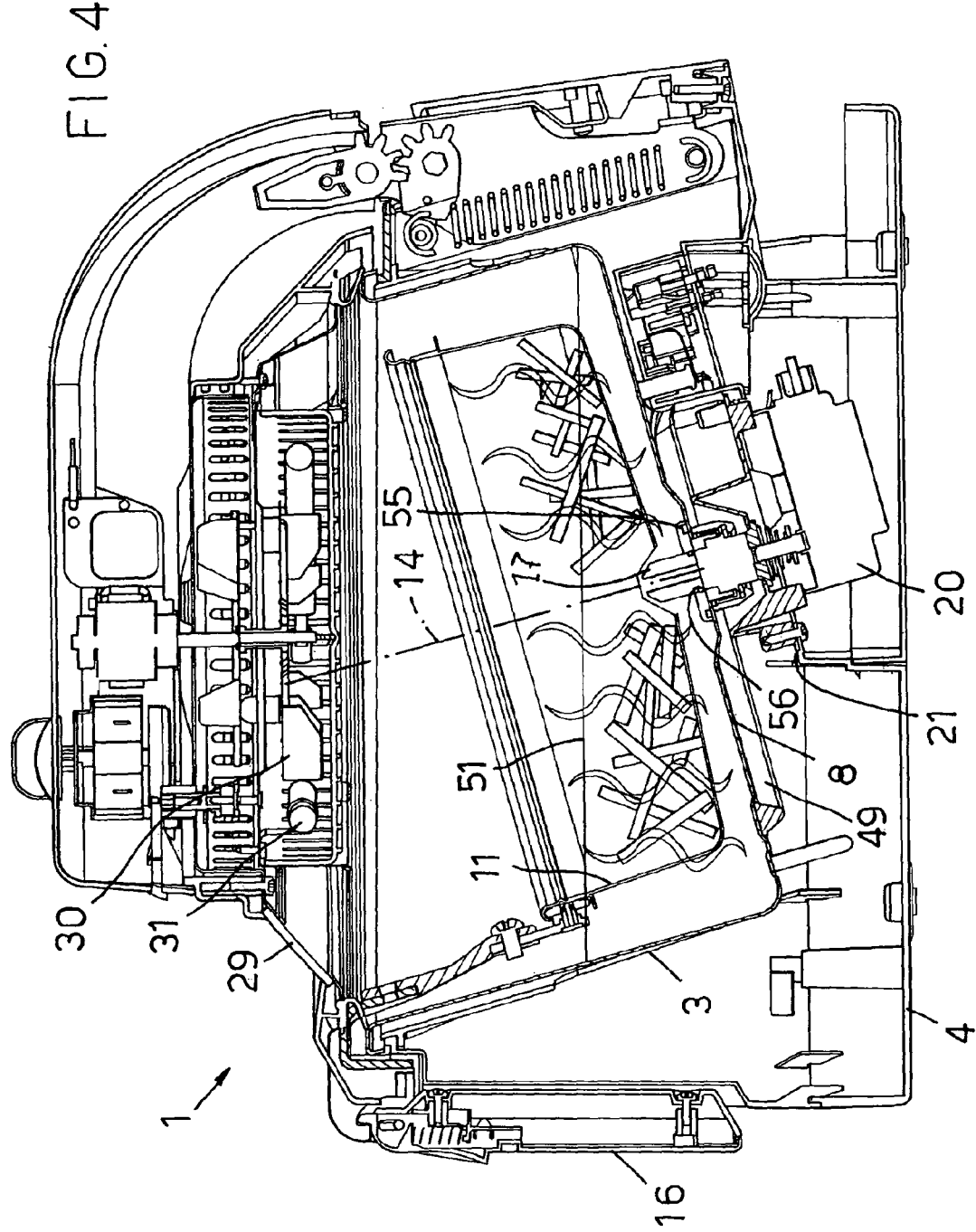
FIG. 4 shows an assembled view of the fryer of FIG. 1 in a cross section, along a diametral plane thereof, from which the paddle has been removed and the perforated basket has been replaced by a net-like basket associated with the rotation means.

For example, the first operating method is chosen (FIG. 3)

Selection of the first operating mode excludes activation of the second heating means.

Firstly, the oil is poured into the space 10 of the container 3. The bottom 8 of the container 3 as mentioned has special tilting to optimise the volume of oil required (i.e. 100 cc) to obtain a predetermined level of oil 51 without necessarily using a large amount.

The food product is placed in the perforated basket 11. The oil, which exceeds the bottom of the basket 11 in height, penetrates it through the holes 15 partly submerging the food contained in the basket 11.

Forced circulation of hot air is created with the heating means inside the container 3 to heat both the oil and the air present in the container 3, and the product 50 in the basket 11 is moved cyclically with the paddle 13 for combined cooking thereof by means of oil when the paddle 13 drives it under the level of oil 51 and by means of air when the paddle drives it above the level of oil 51.

The paddle 13 cyclically immerses the food 50 in the oil and simultaneously exposes it to the action of the flow of air.

The paddle 13 allows all the food 50 to be immersed in the oil, which in static conditions would be impossible in view of the small amount of oil used.

The forced circulation of the hot air is shown in FIG. 3 by an arrow 52 which indicates the axial suctioning of the air to be heated and by arrows 53 which indicate the delivery.

The circulation system creates an environment without dispersions with the outside thereby optimising performances.

At the end of cooking, the basket 11 is raised releasing through the holes 15 in its bottom 8 the excess oil which remains stored in the container 3.

If instead conventional cooking is required (FIG. 4) the second operating mode is selected, which excludes activation of the first heating means in a manner such that it is performed only with the second resistance 49.

The paddle and the perforated basket are removed and the net-like basket is associated to the rotation means.

The container 3 is filled with a larger volume of oil required to obtain the level of oil 51 for correct conventional cooking.

The food product is placed in the basket 11 and it is immersed in the container 3.

The basket is moved in rotation 11 to obtain uniform cooking of the food product.

The fryer thus conceived is susceptible to numerous modifications and variants, all coming within the scope of the inventive concept; moreover all details can be substituted with technically equivalent elements.

In practice, the materials and the dimensions used can be any according to requirements and to the state of the art.

The invention claimed is:

1. Deep fryer for cooking a food product, comprising a main body for housing a container having a central axis that is tilted with respect to a support surface of the deep fryer, the container adapted for receiving oil for cooking said food product, and a basket having a central axis that is tilted with respect to the support surface of the deep fryer, the basket for holding said food product and arranged in a removable manner in said container, comprising first and second heating means, a selector for selecting a first cooking mode with a first volume of oil with said first heating means or a second cooking mode with a second volume of oil greater than said first volume of oil with said second heating means, and rotation means adapted to rotate said basket or at least one mixing paddle present or positionable inside said basket, said first heating means being of the type providing a forced air circulation inside said container.

2. Deep fryer for cooking a food product according to claim 1 wherein said first heating means are integrated in a cover of said container hinged directly or indirectly to said body.

3. Deep fryer for cooking a food product according to claim 1 wherein said first heating means comprise a radial fan circumscribed by at least one first electrical resistance.

4. Deep fryer for cooking a food product according to claim 1 wherein said second heating means comprise at least one second electrical resistance associated to said container.

5. Deep fryer for cooking a food product according to claim 4 wherein second electrical resistance is associated to the bottom of said container.

6. Deep fryer for cooking a food product according to claim 1 wherein said container and said basket are cylindrical and coaxial with a common axis tilted with respect to the support surface of said deep fryer.

7. Deep fryer for cooking a food product according to claim 1 wherein said basket is interchangeable depending on which between said first and second mode of operation is selected.

8. Deep fryer for cooking a food product according to claim 1 wherein the basket comprises a bottom surface and the tilting of the basket results in the bottom surface having a first portion that is higher than a second portion with respect to the support surface of the deep fryer and, for said first mode of operation, the second portion of the bottom surface of said basket is perforated.

9. Deep fryer for cooking a food product according to claim 1, wherein, for said second mode of operation, said basket is net-like.

10. Deep fryer for cooking a food product according to claim 1, wherein, at said first mode of operation associated to said rotation means is said mixing paddle adapted to cyclically introduce and remove said food product from said space in such a manner to perform a combined cooking of said food product by means of said first volume of oil heated by said first heating means when said food product is immersed into said first volume of oil and by means of said air generated by said first heating means when said food product is not dipped into said first volume of oil.

11. Deep fryer for cooking a food product according to claim 5, wherein said rotation means comprise a pin for driving in rotation said paddle or said basket which is oriented coaxially with respect to said container and to said basket and which extends through a central hole of the bottom of said container and of said basket with its first end positioned inside said basket and its second end positioned outside said container.

12. Deep fryer for cooking a food product according to claim 11, wherein said paddle has a central dome having its perimeter edge in contact with said basket along a closed line circumscribing said central hole of said basket, said dome having on its inner side a central sleeve for a removable coupling of said first end of said driving pin, and elastically yielding members for engaging onto said central hole of said basket.

13. Deep fryer for cooking a food product according to claim 5 wherein it has, beneath the bottom of said container, a motor connected to said second end of said driving pin for its rotation.

14. Deep fryer for cooking a food product according to claim 3 wherein said fan and said resistance are accommodated in a box-shaped body having a grid bottom wall for suctioning air from said container, a grid side wall for air delivery into said container, and a top wall for shielding said resistance.

15. Deep fryer for cooking a food product according to claim 14 wherein said top wall is made up of a first and a second shutter element mutually moveable between a first configuration which insulates said container from the external atmospheric environment and a second configuration connecting said container with the external atmospheric environment.

16. Deep fryer for cooking a food product according to claim 15 wherein, present on the external side of said top wall is a box-shaped support for the assembly formed by a cover and by said heating means integrated therein, said box-shaped support holding a motor for operating said fan.

17. Deep fryer for cooking a food product according to claim 16 where it has a mechanical decelerator for closing said cover.

18. Deep fryer for cooking a food product according to claim 17 wherein said mechanical decelerator comprises a first toothed arch of a first profile integral with said box-shaped support and interlocking with a second toothed arch of a second profile pivoted to said body, said second profile having a driving cam of a first end of a spring, one second of whose ends is fixed to said body.

19. Deep fryer for cooking a food product according to claim 1 wherein said first electrical resistance is of the halogen type to improve the visibility of the food during cooking through a special opening made of transparent material provided for in said deep fryer.

* * * * *